(12) United States Patent
Li (10) Patent No.: US 8,998,281 B2
(45) Date of Patent: Apr. 7, 2015

(54) CLAMPING MECHANISM

(71) Applicants: Fu Tai Hua Industry (Shenzhen) Co., Ltd., Shenzhen (CN); Hon Hai Precision Industry Co., Ltd., New Taipei (TW)

(72) Inventor: Jing-Ming Li, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/328,855

(22) Filed: Jul. 11, 2014

(65) Prior Publication Data
US 2015/0015015 A1  Jan. 15, 2015

(30) Foreign Application Priority Data

Jul. 15, 2013 (CN) .......................... 2013 1 02941698

(51) Int. Cl.
*B66C 1/42* (2006.01)
*B25J 15/00* (2006.01)
*B23Q 3/18* (2006.01)

(52) U.S. Cl.
CPC ............... *B25J 15/0028* (2013.01); *B23Q 3/18* (2013.01)

(58) Field of Classification Search
USPC ............. 294/86.4, 67.3, 117, 81.5, 81.6, 115, 294/202, 113, 119.1, 2, 87.1; 248/651, 646; 414/796, 796.9, 729, 621, 622, 623, 414/731, 736
See application file for complete search history.

(56) References Cited

U.S. PATENT DOCUMENTS

| 3,685,070 | A | * | 8/1972 | McClellan et al. | ........... 470/139 |
| 5,141,274 | A | * | 8/1992 | Hayden et al. | ..................... 294/2 |
| 5,971,454 | A | * | 10/1999 | Baan et al. | ..................... 294/188 |
| 5,997,064 | A | * | 12/1999 | Orita | .......................... 294/119.1 |
| 6,371,544 | B1 | * | 4/2002 | Wang | ......................... 294/87.1 |

* cited by examiner

*Primary Examiner* — Stephen Vu
(74) *Attorney, Agent, or Firm* — Novak Druce Connolly Bove + Quigg LLP (57) ABSTRACT

A mechanism for clamping workpieces includes a base body, a first clamping unit, a second clamping unit, and an inserting member. The base body includes at least two elastic members. Both the first clamping unit and the second clamping unit include a splint assembly movably sleeved on the base body and a moving member. The inserting member is coupled to the base body. When the inserting member is withdrawn from or inserted into a space between the two moving members, the two splint assemblies can be moved away from each other to release a workpiece, or brought together to clamp a workpiece.

13 Claims, 9 Drawing Sheets

CLAMPING MECHANISM

FIELD

The subject matter herein generally relates to handling mechanisms.

BACKGROUND

In industrial production, a clamping mechanism is employed to clamp workpieces.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, assembly, series and the like.

The present disclosure is described in relation to a clamping mechanism which includes a base body, a first clamping unit, a second clamping unit, and an inserting member. The base body can include a seat, at least two guide rods installed at opposite sides of the seat, and at least two elastic members each sleeved on one of the at least two guide rods respectively. The first clamping unit can include a first splint assembly sleeved on one of the at least two guide rods and adjacent to the corresponding one of the at least two elastic members, and a first moving member coupled to the first splint assembly. The second clamping unit can include a second splint assembly sleeved on another one of the at least two guide rods, wherein the second splint assembly is parallel to the first splint assembly and adjacent to another one of the at least two elastic members, and a second moving member coupled to the second splint assembly and spaced from the first moving member. The inserting member can be coupled to the base body and located at a side of the first and second moving member away from the seat. The inserting member can be inserted into a space between the first moving member and the second moving member upon pressure, and thereby driving the first splint assembly and the second splint assembly to move away from each other to press the corresponding elastic member, so that the first splint assembly and the second splint assembly can release the workpiece. The inserting member can be configured to break away from the space between the first moving member and the second moving member, whereby in response the first splint assembly and the second splint assembly can be configured to move towards each other to hold workpiece together.

Figure 1:
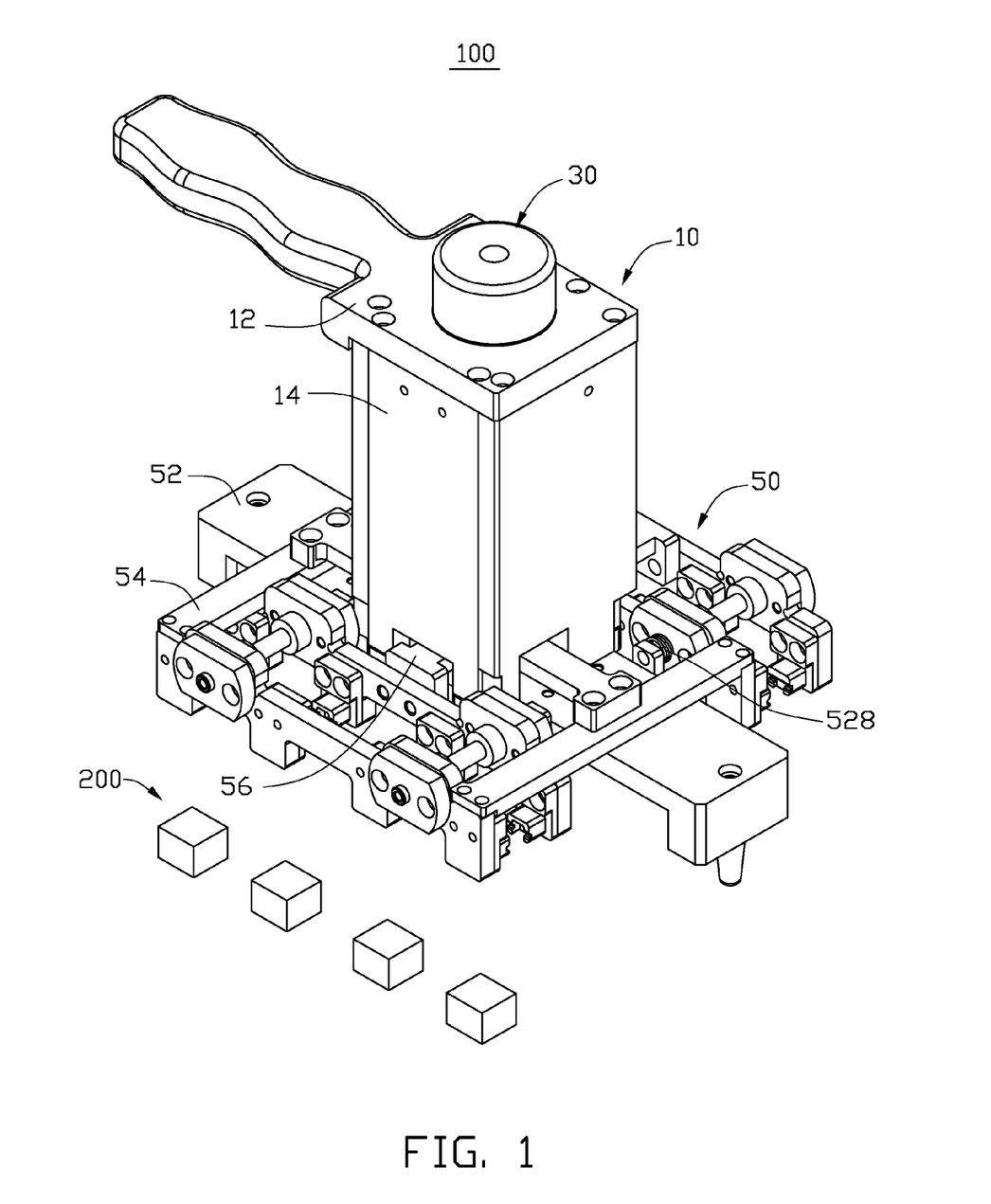
FIG. 1 is an isometric view of an embodiment of a clamping mechanism including a housing, a press assembly, and a clamping assembly.
Figure 2:
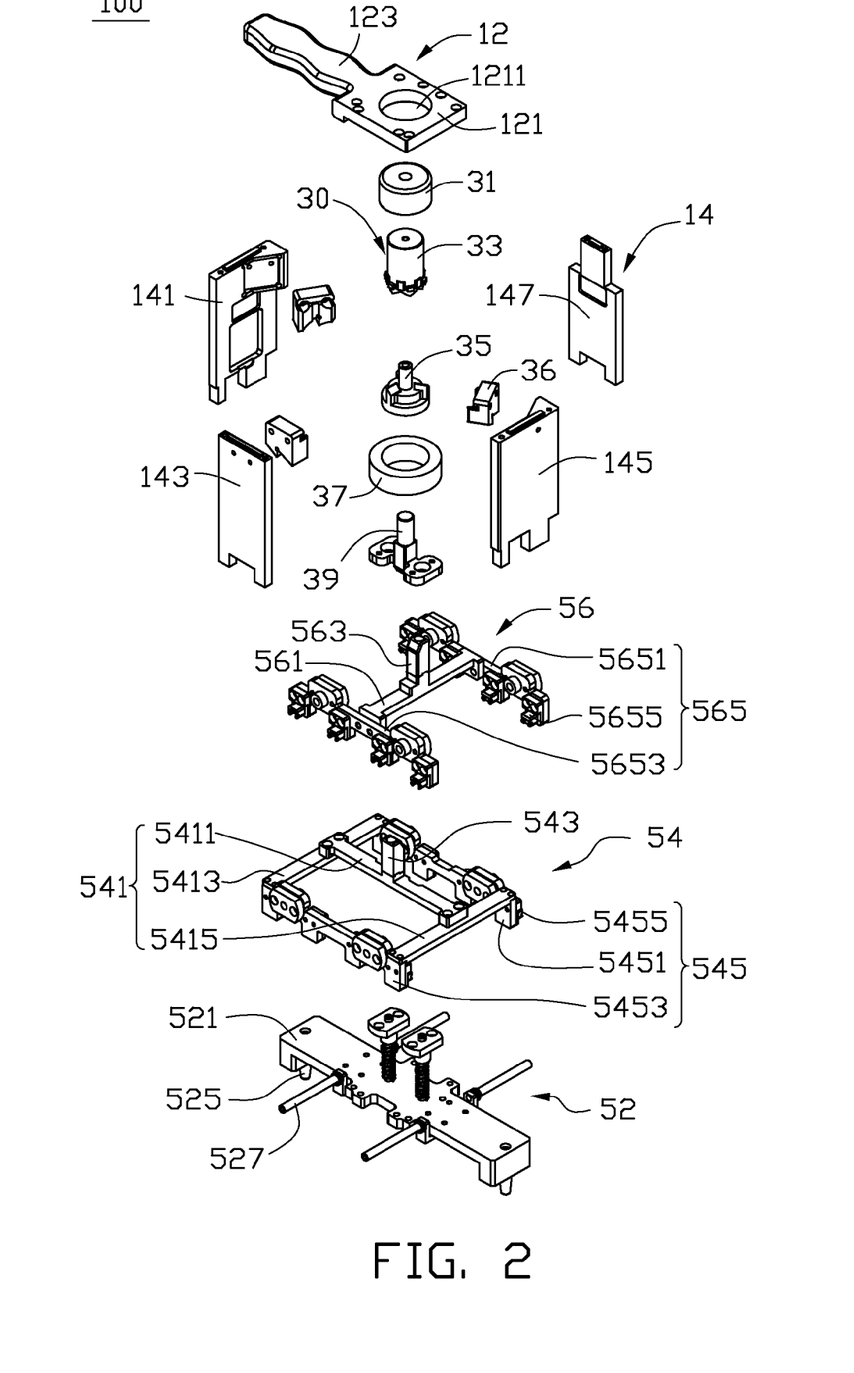
FIG. 2 is an exploded isometric view of the clamping mechanism of FIG. 1.
Figure 3:
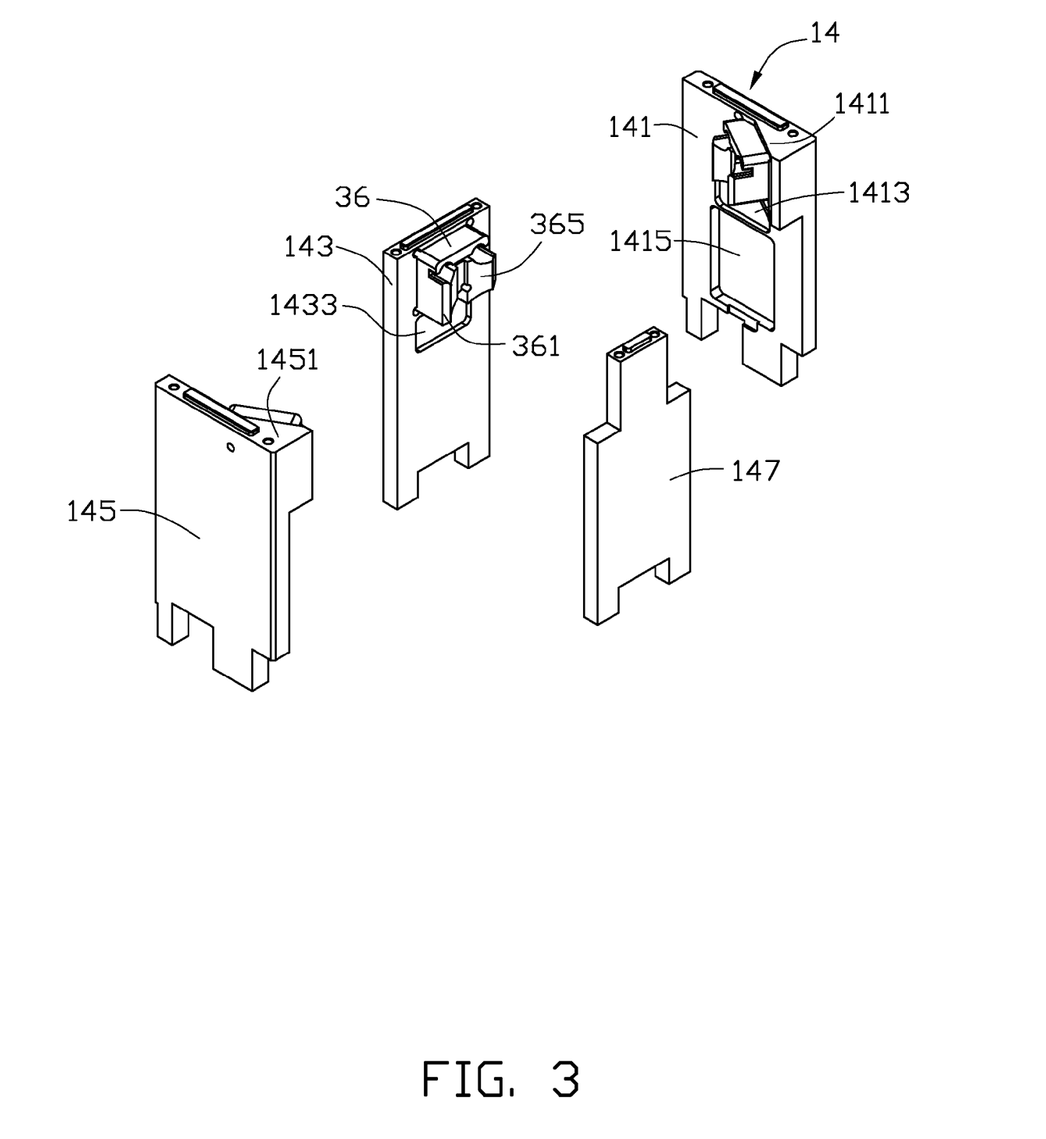
FIG. 3 is an enlarged view of the housing of the clamping mechanism of FIG. 2.
Figure 4:
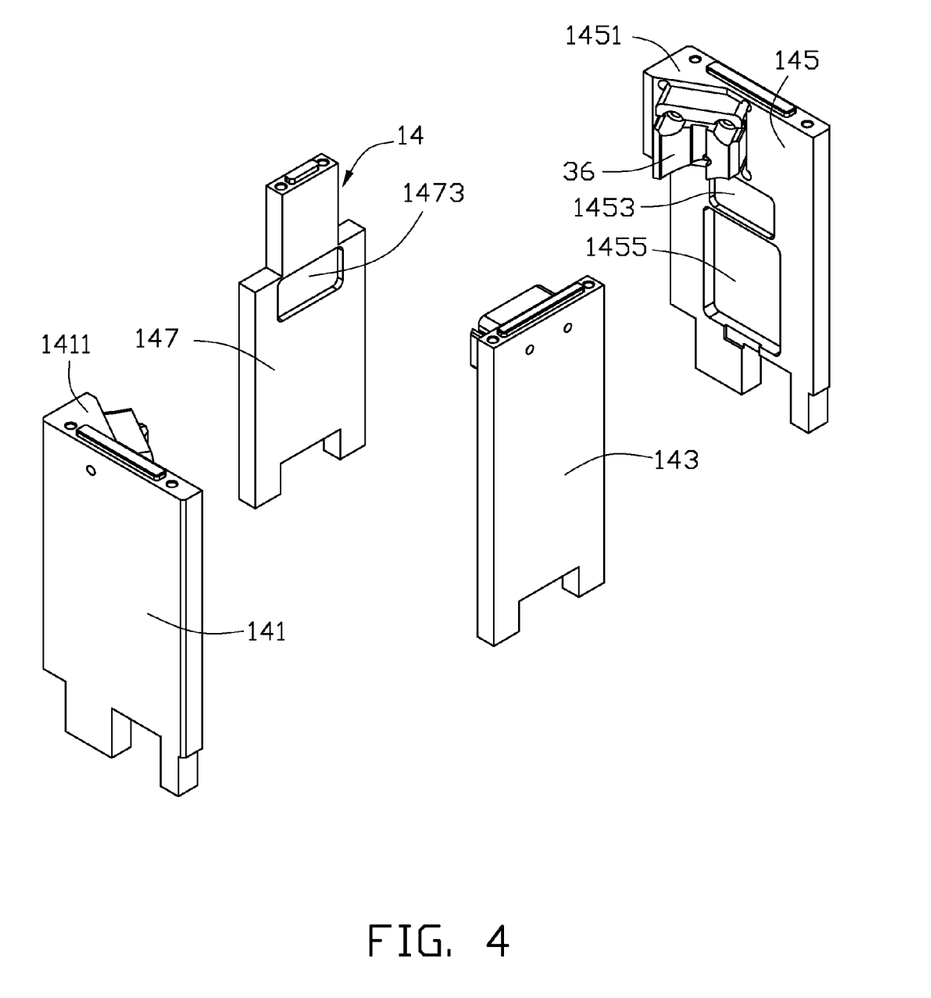
FIG. 4 is similar to FIG. 3, but viewed from another angle.
Figure 5:
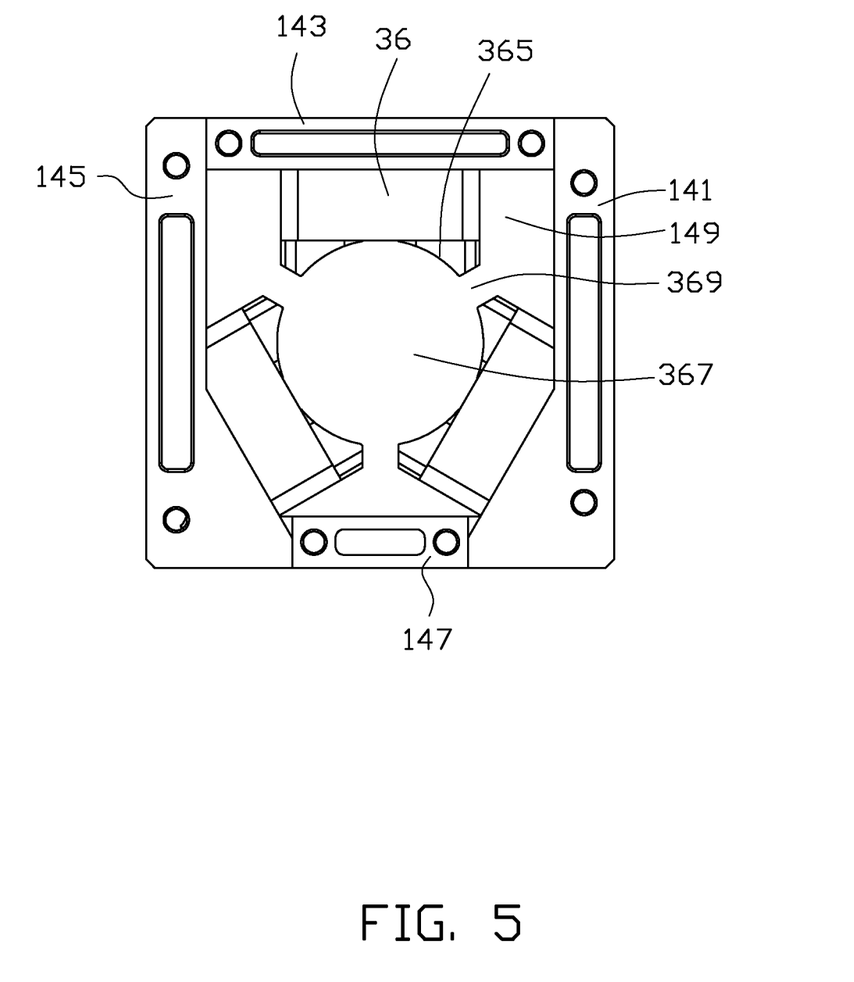
FIG. 5 is a top plan view of the housing of the clamping mechanism of FIG. 1.

FIG. 1 illustrates an embodiment of a clamping mechanism 100. The clamping mechanism 100 can include a pedestal 10, a press assembly 30 received in the pedestal 10, and a clamping assembly 50 coupled to the pedestal 10. The press assembly 30 can drive the clamping assembly 50 to clamp or release a workpiece 200.

FIGS. 2-5 illustrate the pedestal 10 which includes a cover 12 and a housing 14 coupled to the cover 12. The cover 12 can include a main body 121 and a holding portion 123. The main body 121 can be substantially rectangular and define a central through hole 1211. The through hole 1211 can be configured to receive parts of the press assembly 30. The holding portion 123 can extend from a side of the main body 121.

The housing 14 can be coupled to the main body 121, and be configured to receive parts of the press assembly 30 and to hold the clamping assembly 50 together. The housing 14 can include a first sidewall 141, a second sidewall 143, a third sidewall 145, and a fourth sidewall 147. The first sidewall 141 can be parallel to the third sidewall 145, and the second sidewall 143 can be parallel to the fourth sidewall 147. The four sidewalls can cooperatively form a receiving chamber 149. An installation portion 1411 can protrude from an inner side of the first sidewall 141 towards the receiving chamber 149. The installation portion 1411 can be located on an end of the first sidewall 141 adjacent to the main body 121 and adjacent to the fourth sidewall 147. The installation portion 1411 can be wedge-shaped and configured to receive the press assembly 30. The first sidewall 141 can define a fixing portion 1413 adjacent to the installation portion 1411 and a limit portion 1415 adjacent to the fixing portion 1413. The second sidewall 143 can define a fixing portion 1433 matching with the fixing portion 1413. A structure of the third sidewall 145 can be the same as the structure of the first sidewall 141. The installation portion 1451, the fixing portion 1453, and the limit portion 1455 are installed on the third sidewall 145. The fourth sidewall 147 can define a fixing portion 1473 corresponding to the fixing portion 1433. The four fixing portions formed on the four sidewalls match each other and act to hold parts of the press assembly 30 together.

Figure 6:
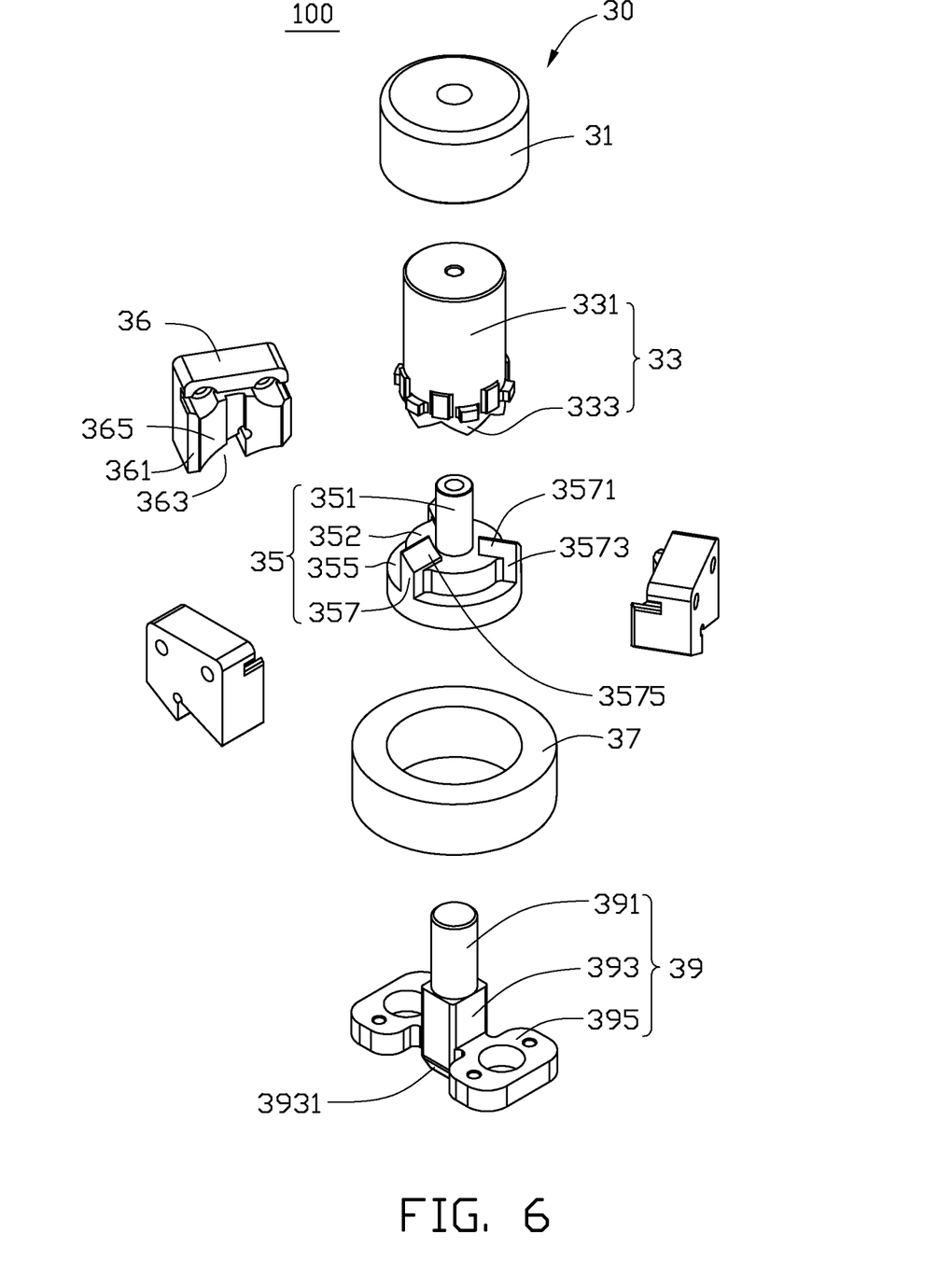
FIG. 6 is an exploded view of the press assembly of the clamping mechanism of FIG. 2.

FIG. 6 illustrates the press assembly 30 which can include a button 31, a press member 33, a rotator member 35, a plurality of limit members 36, a guide sleeve 37, and an inserting member 39. The button 31 can be substantially hollow and cylindrical. An end of the button 31 can be movably inserted into the through hole 1211 and received in the receiving chamber 149, and another end of the button 31 can extend out of the main body 121.

The press member 33 can be substantially cylindrical and include a first shaft 331 and a plurality of first teeth 333. The first shaft 331 can be inserted into the button 31. Each of the plurality of first teeth 333 can be triangular and sawtooth-shaped, extend from an end of the first shaft 331 away from the button 31. The plurality of first teeth 333 can be arranged around a periphery of the first shaft 331.

The rotator member 35 can include a second shaft 351, a first step 352, and a second step 355. The second shaft 351 can be inserted into the press member 33. The first step 352 can extend from an end of the second shaft 351 away from the press member 33. A diameter of the first step 352 can be greater than the diameter of the second shaft 351. The second step 355 can extend from an end of the first step 352 away from the second shaft 351. The diameter of the second step 355 can be greater than the diameter of the first step 352. A plurality of second teeth 352 can protrude from stepped surfaces of the first step 352 and the second step 355 towards the press member 33. The second teeth 357 can be arranged around a periphery of the second step 355. Each of the plurality of second teeth 357 can be rectangular and have, adjacent to the first teeth 333, an inclined plane 3575. Each second tooth 357 can include a first meshing portion 3571 formed on the first step 352 and a second meshing portion 3573 formed on the second step 355. The first meshing portion 3571 can mesh with the first teeth 333, and the second meshing portion 3573 can mesh with the limit member 36.

The limit members 36 can be substantially block-shaped. The limit members 36 can be located around a periphery of the rotator member 35 and a limit member 36 is located on the first sidewall 141, the second sidewall 143, and the third sidewall 145. In the illustrated embodiment, the number of the limit members 36 is three. In other embodiments, the number of the limit members 36 can be one, or two, or more. Each limit member 36 can form two limit teeth 361 on a side away from the press member 33. The two limit teeth 361 cooperatively form a limit groove 363 therebetween. The limit teeth 361 can be configured to mesh with the second meshing portion 3573. Each limit member 36 can include a surface 365 towards the receiving chamber 149, and a part of the surface 365 can be uniformly curved. One limit member 36 is installed at the end of the second sidewall 143 adjacent to the main body 121, and two other limit members 36 can be installed respectively at the installation portion 1411 of the first sidewall 141 and the installation portion 1451 of the third sidewall 145. The surfaces 365 of the three limit members 36 can cooperatively form a cylindrical hole 367 shown in FIG. 4). The cylindrical hole 367 can be configured to receive the rotator member 365, and the diameter of the cylindrical hole 367 can be greater than the diameter of the first step 352 but less than the diameter of the second step 355. A gap 369 can be formed between two adjacent limit members 36. The gap 369 can be configured to receive and latch with the second meshing portion 3573.

The guide sleeve 37 can be substantially hollow and cylindrical. The guide sleeve 37 can be movably sleeved on the second step 355 and be fastened via the four fixing portions of the four sidewalls. In other embodiments, the guide sleeve 37 can be omitted.

The inserting member 39 can include a third shaft 391, an inserting portion 393, and a connecting portion 395. The third shaft 391 can be inserted into the end of the rotator member 35 away from the press member 33. The inserting portion 393 can extend from the end of the third shaft 391 away from the rotator member 35. The inserting portion 393 can be substantially square. Two opposing chamfers can be cut from the inserting portion 393 to form two drive inclines 3931. The connecting portion 395 can extend from sidewalls of the inserting portion 393. In the illustrated embodiment, the number of the connecting portions 395 can be two. The two connecting portions 395 can be located at opposite sidewalls of the inserting portion 393.

Figure 7:
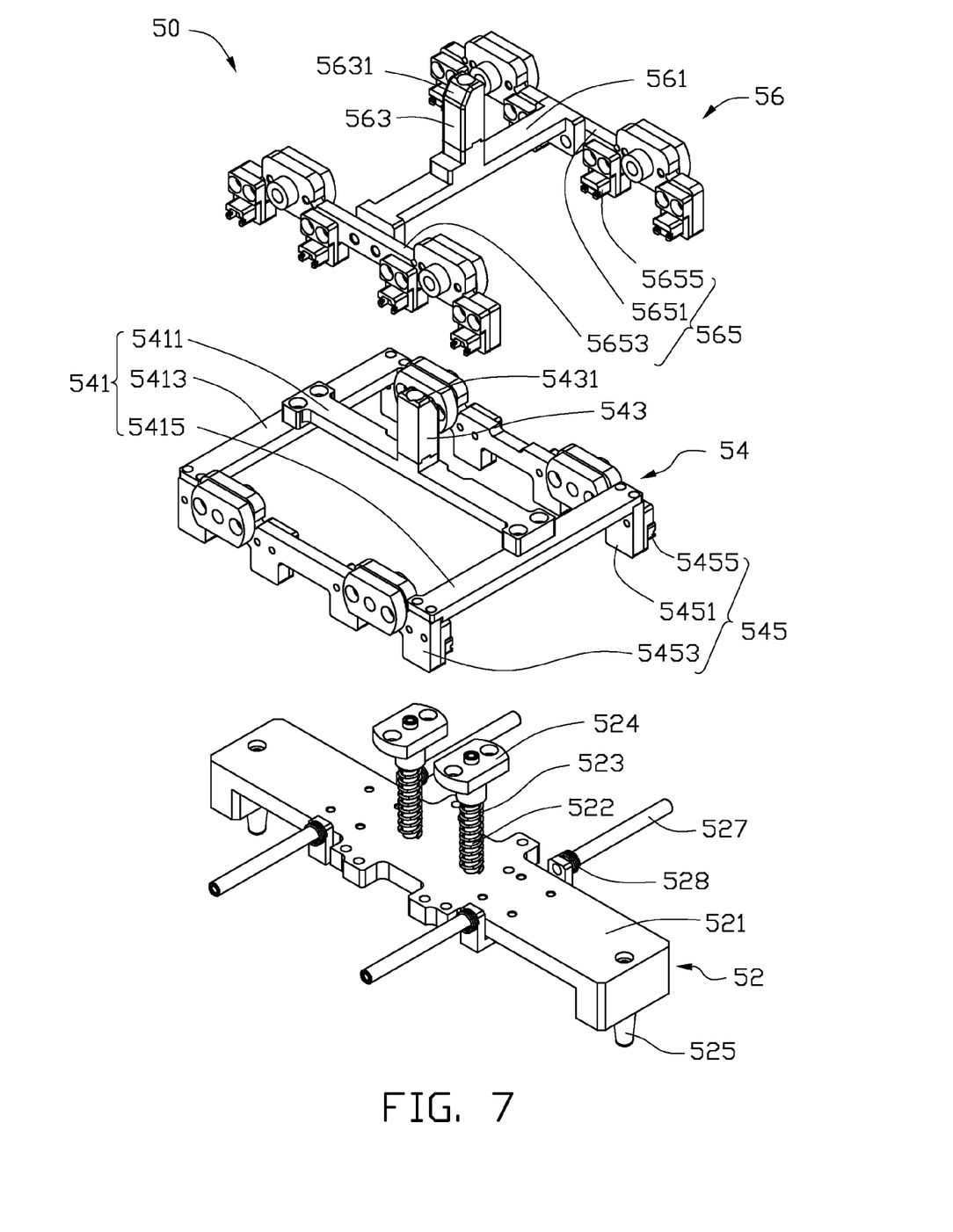
FIG. 7 is an exploded view of the clamping assembly of the clamping mechanism of FIG. 2.

FIG. 7 illustrates that the clamping assembly 50 can include a base body 52, a first clamping unit 54, and a second clamping unit 56. The base body 52 can be coupled to an end of the main body away from the housing. The first clamping unit 54 and the second clamping unit 56 can both be movably assembled to the base body 52.

The base body 52 can include a seat 521, a guide member 522, a restoration member 523, a stopper member 524, a positioning member 525, a guide rod 527, and an elastic member 528.

The seat 521 can be substantially rectangular and coupled to the housing 14. The guide member 522 can be substantially rod-shaped, installed on the seat 521, and received in the housing 14. The restoration member 523 can be elastic and movably sleeved on the guide member 522. In the illustrated embodiment, the restoration member 523 is a spring. The number of the slide members 522, the restoration members 523 and the stopper members 524 can be the same, all being two. In other embodiments, the number of the slide members 522, the restoration members 523 and the stopper members 524 can be one or more than two. The connecting portion 395 can be movably sleeved on an end of the slide member 522 away from the seat 521, so that the restoration member 523 can resist the seat 521 and the connecting portion 395. The stopper member 524 can be sleeved on a terminal of the guide member 522 and cover the connecting portion 395. The stopper 524 can be coupled to the connecting portion 395. In the illustrated embodiment, the stopper member 524 and the connecting portion 395 can be partially received into the limit portion 1415. The number of the positioning members 525 is two, and the two positioning members 525 can be arranged on opposite ends of the seat 521 and located at a side of the seat 521 away from the housing 14. The number of the guide rods 527 and elastic members 528 can be both four. The four guide rods 527 can be located at opposite sides of the seat 521 without the positioning member 525. The elastic member 528 can be sleeved on an end of the guide rod 527 adjacent to the seat 521. When the first clamping unit 54 and the second clamping unit 56 cooperatively clamp the workpiece 200, the guide rod 527 can be configured to guide the first clamping unit 54 and the second clamping unit 56. In other embodiments, the number of the guide rods 522, the restoration members 523 and the stopper members 524 can be the same, being two or more.

The first clamping unit 54 can be movably installed on the seat 52 and include a first connecting member 541, a first moving member 543, and a first splint assembly 565.

The first connecting member 541 can include a first rod 5411, a second rod 5413, and a third rod 5415. The first rod 5411 can be movably inserted into an end of the housing 14 adjacent to the seat 521, and couple the second rod 5413 and the third rod 5415 together. The first moving member 543 can be square and be installed at a center of the first rod 5411. The first moving member 543 can be located at a side of the inserting portion 393 without the connecting portion 395 and adjacent to the two slide member 522. A corner can be cut from the moving member 543 to form a moving incline 5431 to match with the drive incline 3931. The first splint assembly 565 can include a first splint 5451, a second splint 5453, and a first clamping head 5455. The first splint 5451 can be parallel to the first rod 5411, and opposite ends of the first splint 5451 can be coupled respectively to the second rod 5413 and the third rod 5415. The first splint 5451 can be movably sleeved on the guide rod 527 to resist the elastic member 528. In the illustrated embodiment, the number of the first clamping heads 5455 is eight. Four of the first clamping heads 5454 can be installed at a side of the first splint 5451 away from the seat 521. The other four first clamping heads 5454 can be installed at a side of the second splint 5453 towards the seat 521.

The second clamping unit 56 can be movably installed on the seat 52 and include a fourth rod 561, a second moving member 563, and a second splint assembly 565.

The fourth rod 561 can be perpendicular to the first rod 5411 and inserted into the housing 14. The structure of the second moving member 563 can be the same as the structure of the first moving member 543. The second moving member 563 can include a moving incline 5631 to match with the drive incline 3931. The second moving member 563 can be installed on the fourth rod 561 and parallel to the first moving rod 543. The second moving member 563 can be located at a side of the inserting portion 393 without the connecting portion 395. The second splint assembly 565 can include a third splint 5651, a fourth splint 5653 parallel to the third splint 5651, and a second clamping head 5655. The third splint 5651 and the fourth splint 5653 can be coupled to opposite ends of the fourth rod 561. The third splint 5651 can be movably sleeved on the guide rod 527 and located at a side of the first splint 5451 away from the seat 521. The fourth splint 5656 can be movably sleeved on the guide rod 527, located at a side of the second splint 5453 adjacent to the seat 521, and resist the elastic member 528. The second clamping heads 5655 can be located on the third splint 5651 and the fourth splint 5653 so as to correspond with the first clamping heads 5455.

Figure 8:
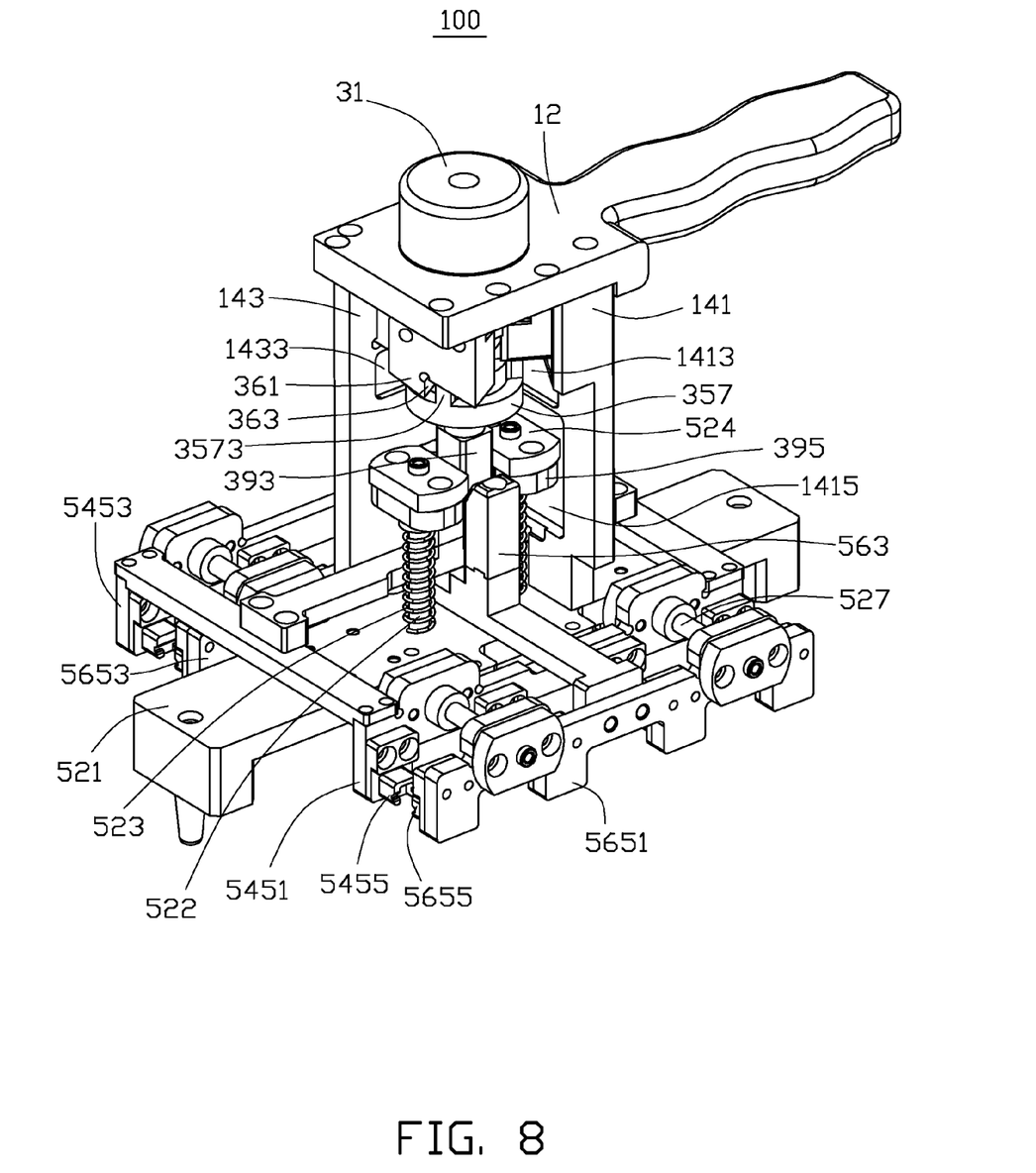
FIG. 8 is the clamping mechanism of FIG. 1 viewed from another angle in a clamping state.

FIG. 8 illustrates that when the first clamping head 5455 and the second clamping head 5655 are in a released state, the second meshing portion 3573 of the rotator member 35 can latch with the limit groove 363 of the limit member 36. The inserting portion 393 of the inserting member 39 coupled to the rotator member 35 can extend into a space between the first moving member 543 and the second moving member 563, thereby spacing the first clamping unit 54 from the second clamping unit 56. The first clamping head 5455 and the second clamping head 5655 can thus be spaced from each other. The plurality of clamping members 528 can be deformed upon pressure from the first splint 5451 and the fourth splint 5653.

Figure 9:
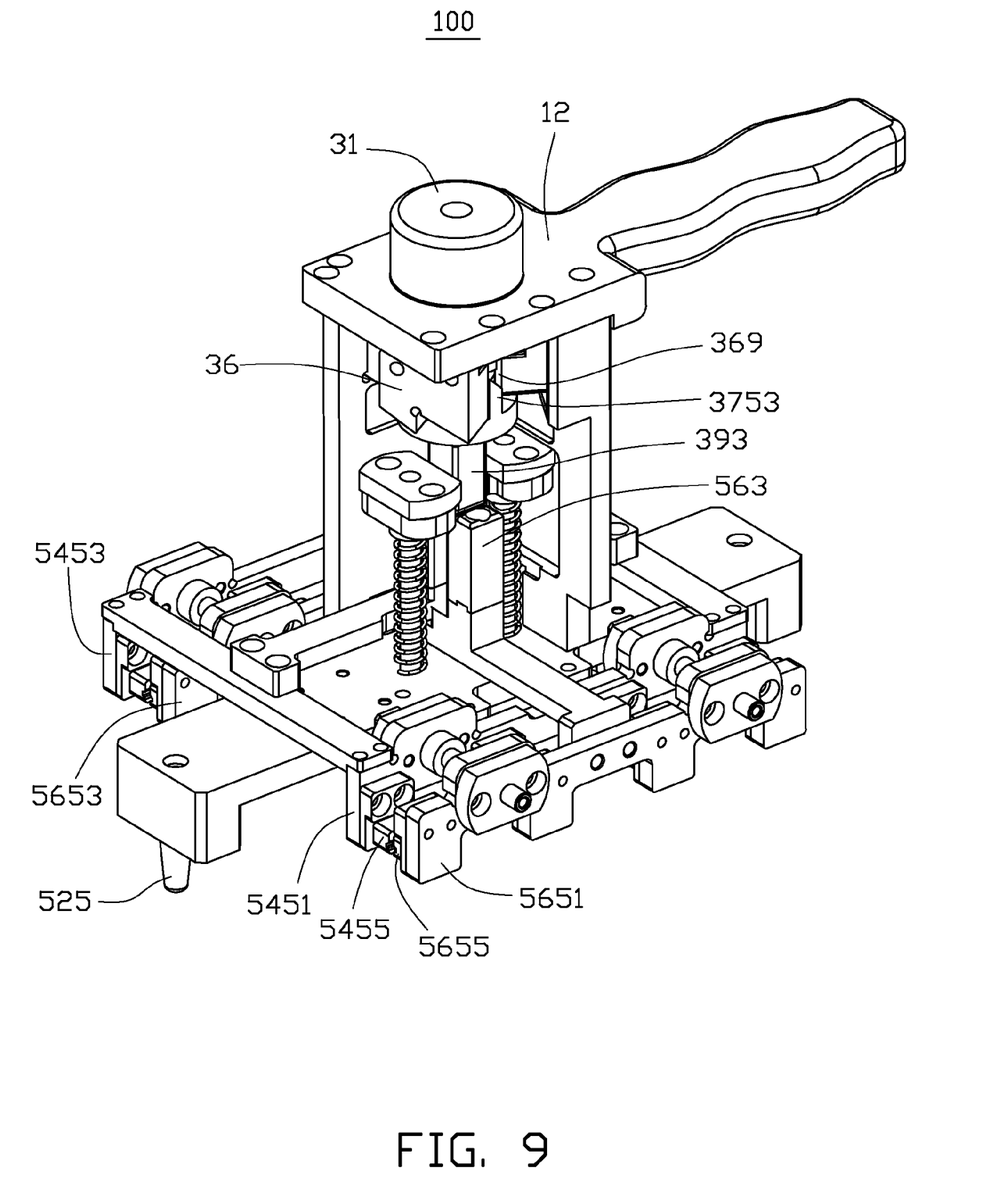
FIG. 9 is the clamping mechanism of FIG. 1 viewed from another angle in a released state.

FIG. 9 illustrates the clamping mechanism 100 in a clamping operation. The mechanism 100 can be installed on a work table not shown) via the positioning member 525. The first clamping head 5455 and the second clamping head 5655 can be brought to the workpiece 200. The button 31 can be pressed thereby moving the press member 33. The first meshing portion 333 can thereby push the first meshing portion 3571 to move, and the rotator member 35 can move along a direction away from the limit member 36 and can rotate clockwise. The pressure can deform the restoration member 523. When the second meshing portion 3573 breaks away from the limit groove 363 and does not engage with one of the limit teeth 361, the button 31 cannot be pressed. The second meshing portion 3573 can mesh with the other limit teeth 361 because of restoring force from the restoration member 523, so that the rotator member 35 can stop rotating and the second meshing portion 3573 can be received into the gap 369 between two adjacent limit members 36. The limit teeth 361 can resist the stepped surface of the second step 355, and the inserting member 39 can break away from the space between the first moving member 543 and the second moving member 563. The first clamping unit 54, driven by the restoring force, can move along a first direction, thereby moving the first splint 5451 away from the seat 521 and moving the second splint 5453 towards the seat 521. The second clamping unit 56 can move along a second direction opposite to the first direction, thereby moving the third splint 5651 towards the seat 521 and moving the fourth splint 5653 away from the seat 521. In that way, the first clamping head 5455 and the second clamping head 5655 can move towards each other to firmly clamp the workpiece 200.

For an operation to release, the button 31 can be pressed, thereby driving the drive incline 3931 of the inserting member 39 to push the moving inclines 5431, 5631), so that the first moving member 543 can be spaced from the second moving member 563 and the inserting portion 393 can extend into the space between the first moving member 543 and the second moving member 563. The first clamping unit 54 can move along the second direction, thereby moving the first splint 5451 towards the seat 521 and moving the second splint 5453 away from the seat 521. In this way, the first clamping head 5455 and the second clamping head 5655 can move away from each other to release the workpiece 200.

When the second meshing portion 3573 breaks away from the gap 369, the first tooth 333 can push the first meshing portion 3571, thereby moving the rotator member 35 away from the limit member 36 and rotating the rotator member clockwise, so that the second meshing portion 3573 can mesh with one of the limit teeth 361. When the button 31 is released, the second meshing portion 3573 can slide along an inclined surface of the limit teeth 361, so that the second meshing portion 3573 can be received into and latched with the limit groove 363.

The structure of the clamping mechanism 100 can be simplified. The first clamping unit 54 can only include a first moving member 543 and a first splint assembly 545. The second clamping unit 56 can also only include a second moving member 563 and a second splint assembly 565. The first splint assembly 545 and the second splint assembly 565 can both only include a splint and a clamping head. The number of the first clamping heads 5455 and the second clamping heads 5655 can be one or more than one.

The pedestal 10 can be omitted, so long as the connecting portion 395 of the inserting member 39 can be sleeved on the slide member 525, and the seat 52 can be installed on the worktable.

A single limit member 36 can take the place of the three limit members 36 so long as the single limit member 36 is hollow and cylindrical. The single limit member 36 can include a plurality of limit teeth 361 and define a slit instead of the gap 369 to receive the second meshing portion 3573.

The button 31 can be omitted so long as the first shaft of the press member 33 extends through the through hole 1211.

The stopper member 524 can be omitted, so long as the connecting portion 395 is movably sleeved on the guide member 522.

While the present disclosure has been described with reference to particular embodiments, the description is illustrative of the disclosure and is not to be construed as limiting the disclosure. Therefore, those of ordinary skill in the art can make various modifications to the embodiments without departing from the true spirit and scope of the disclosure, as defined by the appended claims.

What is claimed is:

1. A clamping mechanism comprising:
    a base body comprising:
        a seat;
        at least two guide rods installed at opposite sides of the seat;
        at least two elastic members each sleeved on one of the at least two guide rods respectively;
    a first clamping unit comprising:
        a first splint assembly sleeved on one of the at least two guide rods and adjacent to the corresponding one of the at least two elastic members;
        a first moving member coupled to the first splint assembly;
    a second clamping unit comprising:
        a second splint assembly sleeved on another one of the at least two guide rods, wherein the second splint assembly is parallel to the first splint assembly and adjacent to another one of the at least two elastic members;
        a second moving member coupled to the second splint assembly and spaced from the first moving member; and
    an inserting member coupled to the base body and located at a side of the first and second moving member away from the seat, wherein the inserting member is inserted into a space between the first moving member and the second moving member upon pressure, and thereby driving the first splint assembly and the second splint assembly to move away from each other to press the corresponding elastic member, so that the first splint assembly and the second splint assembly release the workpiece;
    wherein the inserting member is configured to break away from the space between the first moving member and the second moving member, whereby in response the first splint assembly and the second splint assembly are configured to move towards each other to hold workpiece together.

2. The clamping mechanism of claim 1, wherein the clamping mechanism further comprises a pedestal, the pedestal comprise a housing coupled to the seat and a cover covering an end of the housing away from the seat, the inserting member is received in the housing.

3. The clamping mechanism of claim 2, wherein the first clamping unit further comprises a first connecting member comprising a second rod, a third rod parallel to the second rod, and a first rod coupling the second rod and the third rod and extending through the housing, wherein the first moving member is installed on the first rod, and the first splint assembly comprises a first splint coupling the second rod and the third rod, a second splint parallel to the first splint and coupling the second rod and the third rod, and a plurality of first clamping heads installed on the first splint and the second splint, wherein the first splint is sleeved on the guide rod located on the side of the seat and resists the elastic member, the second splint is sleeved on the guide rod located on another side of the seat.

4. The clamping mechanism of claim 3, wherein the second clamping unit further comprises a fourth rod extending through the housing, wherein the second moving member is installed on the fourth rod, and the second splint assembly comprises a third splint, a fourth splint parallel to the third splint, and a plurality of second clamping heads installed on the third splint and the fourth splint, wherein the third splint is installed at an end of the fourth rod, is sleeved on the guide rod located on a side of the seat, resists the elastic member, and is parallel to the first splint, the fourth splint is installed at another end of the fourth rod, is sleeved on the guide rod located on another side of the seat, and is parallel to the second splint, and each second clamping head matches with the corresponding first clamping head to clamp the workpiece together.

5. The clamping mechanism of claim 2, wherein the clamping mechanism further comprises:
    a rotator member coupled to the inserting member,
    a press member coupled to the rotator member and extending out of the cover, wherein the press member drives the rotator member to move the inserting member upon depression, so that the inserting member is inserted into the space between the first moving member and the second moving member, and
    a limit member located between the rotator member and the housing, wherein the limit member is configured to latch with the rotator member.

6. The clamping mechanism of claim 5, wherein the clamping mechanism further comprises a button and a guide sleeve, an end of the press member away from the rotator member is received in the button, the button extends through the cover, the guide sleeve is sleeved on the rotator member and coupled to the housing.

7. The clamping mechanism of claim 6, wherein the cover comprises a main body and a holding portion extending from a side of the main body, the main body defines a through hole configured to receive the button.

8. The clamping mechanism of claim 6, wherein the housing comprises a first sidewall, a second sidewall, a third sidewall, and a fourth sidewall, the first sidewall and the third sidewall form a installation portion to receive the limit member, a fixing portion to receive the guide sleeve, and a limit portion respectively.

9. The clamping mechanism of claim 5, wherein the press member form a plurality of first teeth on an end, the plurality of first teeth are arrange around the press member, the rotator member forms a plurality of second teeth meshing with the first teeth and the limit member, and each second tooth comprises an inclined plane adjacent to the first teeth.

10. The clamping mechanism of claim 9, wherein the rotator member comprises a first step and a second step extending from an end of the first step, a diameter of the second step is greater than the diameter of the first step, each second tooth comprises a first meshing portion formed on the first step and a second meshing portion formed on the second step, the first meshing portion meshes with the first tooth, the limit member forms a plurality of limit teeth, the second meshing portion latch between two adjacent limit teeth.

11. The clamping mechanism of claim 1, wherein the inserting member comprises a inserting portion and a connecting portion protruding from sidewalls of the inserting portion, the connecting portion is movably installed on the base body, the inserting portion is located at the side of the first and second moving member away from the seat.

12. The clamping mechanism of claim 11, wherein the base body further comprises a guide member and a restoration member, the guide member is installed on the seat and adjacent to the first moving member and the second moving member, the connecting portion is movably sleeved on the guide member, the restoration member is sleeved on the guide member and resists the seat and the connecting portion.

13. The clamping mechanism of claim 11, wherein the inserting portion forms a drive incline on an end adjacent to the first moving member and the second moving member, the first moving member and the second moving member form a moving incline matching with the drive incline respectively.

* * * * *